F. P. THOMPSON.
Nut-Locks.

No. 141,403.                                                     Patented July 29, 1873.

Witnesses:
John King
Chas. H. Isham

Inventor:
Fred. P. Thompson by
Myers & Co. Attys.

UNITED STATES PATENT OFFICE.

FREDERICK P. THOMPSON, OF FREDERICKTON, CANADA.

IMPROVEMENT IN NUT-LOCKS.

Specification forming part of Letters Patent No. 141,403, dated July 29, 1873; application filed June 2, 1873.

*To all whom it may concern:*

Be it known that I, FREDK. P. THOMPSON, of Frederickton, New Brunswick, in the Dominion of Canada, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to that class of devices known as nut-locks; and consists in certain modifications of the details in the construction of the same, as hereinafter shown and described.

Figure 10:
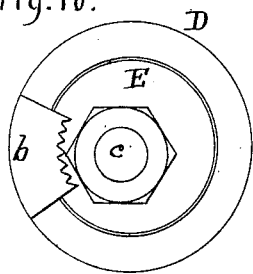
Figure 9:
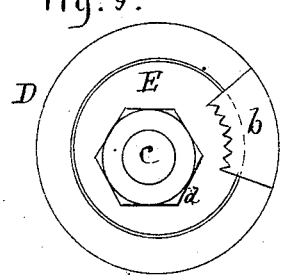
Figure 8:
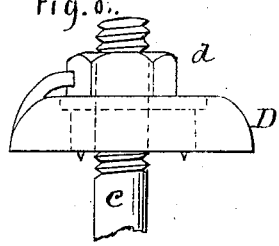
Figure 7:
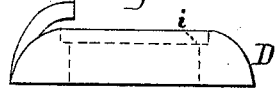
Figure 6:
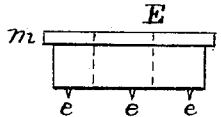
Figure 5:
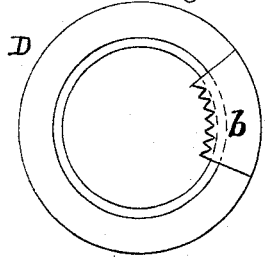
Figure 4:
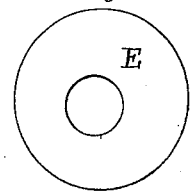
Figure 1:
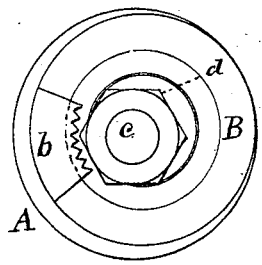
Figure 2:
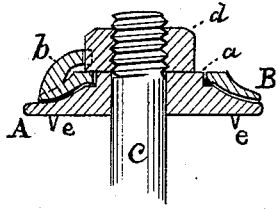
Figure 3:
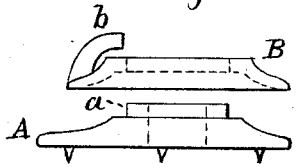

In the accompanying drawing, which forms a part of the specification herein, Figure 1 is a plan of my improved nut-lock when same is locked. Fig. 2 is a vertical section of same. Fig. 3 represents the upper and lower parts separated. Fig. 4 is a plan of washer used in a variation of the construction of nut-lock. Fig. 5 is a plan of collar used in such variation. Figs. 6 and 7 are side views of washer and collar. Fig. 8 is a side elevation. Fig. 9 is a plan of nut-lock when unlocked. Fig. 10 is a plan of same when locked.

In the drawing referred to, A designates the lower part or base of the nut-lock, which is of the form shown in the drawing in Figs. 1, 2, and 3, provided with the upward circular projection or shoulder $a$, and the points $e$ made solid therewith. The upper annular plate B is constructed to set against and upon the base A, and surround the projection $a$, as shown. The said plate B is provided with the curved fastener $b$ made solid therewith, same projecting inwardly and provided with teeth, as shown in Fig. 1. The screw-bolt $c$ passes through an aperture for the purpose, which, as shown in Fig. 2, is in a position eccentric relatively with the circumference of projection $a$.

In operation, the base A and annular plate B are placed in position on the screw-bolt; the nut $d$ is then placed on and turned with a wrench, until the whole is pressed down until the points $e$ enter the wood beneath the base A. At the same time the annular plate B is also rotated, so that the angle of nut $d$ is brought within a notch formed by the teeth in the fastener $b$, as shown in Fig. 1.

In a variation of the construction, the collar D is provided with the fastener $b$, the said collar having the shoulder $i$. Within the collar is the washer E, having the flange $m$ resting on the shoulder $i$, and the points $e$ made solid therewith. When the nut $d$ and fastener $b$ are properly rotated, so that the points $e$ pierce the wood beneath the washer, and the nut $d$ is wrenched down as far as it will go, and its angle within a notch in fastener $b$, as shown in Fig. 10, the said nut is turned slightly backward or loosened, in order that the nut may be clutched by the teeth of the fastener at a proper angle.

Having described my invention, I claim—

1. The combination of the base A, provided with shoulder $a$ and points $e$, with the annular plate B having fastener $b$, all being constructed and operating as set forth.

2. In combination with the base A, provided with shoulder $a$ and points $e$, and annular plate B provided with fastener $b$, the eccentric axis formed by screw-bolt $c$, as shown.

In testimony that I claim the foregoing, I have hereunto set my hand and seal this 28th day of April, 1873.

FRED. P. THOMPSON. [L. S.]

Witnesses:
 THEO. W. HUBBELL,
 JOHN MACKAY.